(12) United States Patent
Kitada et al.

(10) Patent No.: US 9,512,326 B2
(45) Date of Patent: Dec. 6, 2016

(54) INK JET INK COMPOSITION, RECORDING METHOD, AND RECORDING APPARATUS (71) Applicant: Seiko Epson Corporation, Tokyo (JP)

(72) Inventors: Kenji Kitada, Matsumoto (JP); Masahiro Yatake, Shiojiri (JP); Hiroshi Mukai, Shiojiri (JP); Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/672,607

(22) Filed: Mar. 30, 2015

(65) Prior Publication Data
US 2015/0274999 A1 Oct. 1, 2015

(30) Foreign Application Priority Data

Mar. 31, 2014 (JP) .................. 2014-071243

(51) Int. Cl.
G01D 11/00 (2006.01)
C09D 11/107 (2014.01)
C09D 11/30 (2014.01)
C09D 11/10 (2014.01)

(52) U.S. Cl.
CPC ............. *C09D 11/107* (2013.01); *C09D 11/10* (2013.01); *C09D 11/30* (2013.01)

(58) Field of Classification Search
None
See application file for complete search history.

(56) References Cited

U.S. PATENT DOCUMENTS

| 2002/0107303 A1 | 8/2002 | Miyabashi et al. |
| 2003/0143344 A1 | 7/2003 | Yau et al. |
| 2006/0125897 A1 | 6/2006 | Choi et al. |
| 2010/0328411 A1 | 12/2010 | Ganapathiappan et al. |

(Continued)

FOREIGN PATENT DOCUMENTS

| EP | 0796901 A2 | 9/1997 |
| EP | 2423274 A1 | 2/2012 |

(Continued)

OTHER PUBLICATIONS

Extended European Search Report for EP 15 16 2048 dated Oct. 20, 2015 (16 pages).

(Continued)

*Primary Examiner* — Erica Lin
(74) *Attorney, Agent, or Firm* — Harness, Dickey & Pierce, P.L.C.

(57) ABSTRACT

There is provided an ink jet ink composition, which is used in a recording method including ejecting the ink jet ink composition from a recording head of head temperature C (unit: ° C.) onto a recording medium to adhere the ink jet ink composition thereonto and drying the recording medium, on which the ink jet ink composition is adhered, at drying temperature D (unit: ° C.), including water; and a polymer particle, in which the polymer particle has a core polymer containing a polymer of glass transition temperature A (unit: ° C.) and a shell polymer containing a polymer of glass transition temperature B (unit: ° C.) and formed on the surface of the core polymer, and in which the A, B, C, and D satisfy predetermined relations.

8 Claims, 1 Drawing Sheet (56) References Cited

U.S. PATENT DOCUMENTS

2014/0362136 A1* 12/2014 Yatake .................. C09D 11/30
347/20

FOREIGN PATENT DOCUMENTS

| | | |
|---|---|---|
| EP | 2913371 A1 | 9/2015 |
| JP | 2006-045304 A | 2/2006 |
| JP | 4003239 B2 | 11/2007 |
| JP | 2008-260300 A | 10/2008 |
| JP | 2012-201761 A | 10/2012 |
| JP | 2013-060565 A | 4/2013 |

OTHER PUBLICATIONS

Partial European Search Report for European Patent Application No. 15162048.1 dated Jul. 1, 2015 (7 pages).

* cited by examiner

INK JET INK COMPOSITION, RECORDING METHOD, AND RECORDING APPARATUS

BACKGROUND

1. Technical Field

The present invention relates to an ink jet ink composition, a recording method, and a recording apparatus.

2. Related Art

Ink jet recording methods have been rapidly developed in many areas because high-definition images can be recorded by a relatively simple apparatus. Among these methods, various studies have been made about ejection stability and the like. For example, in JP-A-2008-260300, there is described an ink jet ink composition which is excellent in ejection stability, which has improved feathering resistance to plain paper, and which can obtain an image or a print having high abrasion resistance even to a recording medium that is difficult to absorb an ink composition. Specifically, JP-A-2008-260300 discloses ink jet ink containing at least a pigment, water, an aqueous solvent, and a polymer particle, in which the polymer particle has a core-shell structure composed of a core polymer and a shell polymer, and the shell polymer contains a predetermined monomer.

The polymer particle used in JP-A-2008-260300 is not designed in consideration of temperature of a recording head, temperature of a recording medium, and drying temperature at the time of ink ejection during a printing process. However, in the ink composition containing the polymer which is formed into a film on a recording medium by heating, a polymer adheres in a recording head. In order to improve the ejection stability of the ink composition by preventing the adherence of the polymer, improving the glass transition temperature (hereinafter, referred to as "Tg") of the polymer constituting the polymer particle is considered. However, when the Tg of the polymer is improved, the softening of the polymer is unlikely to occur when forming a film on the recording medium by heating. For this reason, there is a problem in that the adhesiveness between the polymer and the recording medium becomes poor. Meanwhile, even when the Tg of the polymer is lowered such that the adhesiveness is improved even by relatively low-temperature heating, the adherence of the polymer in the warmed recording head easily occurs, and thus there is a problem of ejection stability becoming poor.

SUMMARY

An advantage of some aspects of the invention is to provide an ink jet ink composition having excellent ejection stability and adhesiveness, a recording method using the ink jet ink composition, and a recording apparatus using the ink jet ink composition.

The present inventors have conducted intensive studies in order to solve the above problems. As a result, they have found that the above problems can be solved by using predetermined polymer particles, thus completing the invention.

That is, the invention is as follows.

[1] According to an aspect of the invention, there is provided an ink jet ink composition, which is used in a recording method including ejecting the ink jet ink composition from a recording head of head temperature C (unit: ° C.) onto a recording medium to adhere the ink jet ink composition thereonto and drying the recording medium, on which the ink jet ink composition is adhered, at drying temperature D (unit: ° C.), including water; and a polymer particle, in which the polymer particle has a core polymer containing a polymer of glass transition temperature A (unit: ° C.) and a shell polymer containing a polymer of glass transition temperature B (unit: ° C.) and covering at least a part of the core polymer, and in which the glass transition temperature A and the glass transition temperature B satisfy Formula (1) below, and the glass transition temperature A and the glass transition temperature B satisfy Formula (2) below in the relation with the head temperature C and the drying temperature D.

$$10 < B-A \quad (1)$$

$$C < B < D \quad (2)$$

[2] In the ink jet ink composition according to the above [1], the shell polymer may contain a polymer having a (meth)acrylate unit and a carboxylic acid monomer unit.

[3] In the ink jet ink composition according to the above [1] or [2], the glass transition temperature A may be −10° C. to 60° C.

[4] In the ink jet ink composition according to any one of the above [1] to [3], in the ejecting of the ink jet ink composition, the ink jet ink composition may be used in the recording method in which the recording medium is heated from a side of the recording head.

[5] In the ink jet ink composition according to any one of the above [1] to [4], the ink jet ink composition may further include at least one of a fluorine-based surfactant and a silicone-based surfactant; and at least one of a glycol ether and an alkyl diol of 3 to 8 carbon atoms.

[6] In the ink jet ink composition according to any one of the above [1] to [5], the ink jet ink composition may be used in the recording method in which the drying temperature D is 45° C. to 130° C.

[7] In the ink jet ink composition according to any one of the above [1] to [6], in the ejecting of the ink jet ink composition, the ink jet ink composition may be used in the recording method in which the surface temperature E (unit: ° C.) of the recording medium is 30° C. to 70° C.

[8] In the ink jet ink composition according to the above [7], the glass transition temperature B and the surface temperature E may satisfy Formula (3) below.

$$E < B \quad (3)$$

[9] According to another aspect of the invention, there is provided a recording method, including ejecting an ink jet ink composition from a recording head of head temperature C (unit: ° C.) onto a recording medium to adhere the ink jet ink composition thereonto; and drying the recording medium, on which the ink jet ink composition is adhered, at drying temperature D (unit: ° C.), in which the ink jet ink composition contains water and a polymer particle, in which the polymer particle has a core polymer containing a polymer of glass transition temperature A (unit: ° C.) and a shell polymer containing a polymer of glass transition temperature B (unit: ° C.) and formed on the surface of the core polymer, and in which the glass transition temperature A, the glass transition temperature B, the head temperature C, and the drying temperature D satisfy Formulae (1) and (2) below.

$$10 < B-A \quad (1)$$

$$C < B < D \quad (2)$$

[10] In the recording method according to the above [9], the glass transition temperature B and the surface temperature E may satisfy Formula (3) below.

$$E < B \quad (3)$$

[11] According to still another aspect of the invention, there is provided recording apparatus, including a recording head ejecting the ink jet ink composition according to any one of the above [1] to [8] onto a recording medium; a head heating unit heating the recording head to head temperature C (unit: ° C.); and a drying unit drying the recording medium, on which the ink jet ink composition is adhered, at drying temperature D (unit: ° C.).

BRIEF DESCRIPTION OF THE DRAWINGS

The invention will be described with reference to the accompanying drawing, wherein like numbers reference like elements.

DESCRIPTION OF EXEMPLARY EMBODIMENTS

Hereinafter, an embodiment of the invention (hereinafter, referred to as "present embodiment") will be described in detail with reference to the drawings as necessary, but the invention is not limited thereto. Various modifications can be made within the scope not departing from the gist thereof. In the drawings, the same elements are given the same reference numerals, and the same description will not be repeated. In addition, the positional relations such as top, bottom, left, and right is based on the positional relations shown in the drawings unless otherwise specified. Further, the ratio of the dimensions is not limited to the ratio shown in the drawings. Moreover, in the present specification, "(meth)acryl" means "acryl", and "methacryl" corresponding thereto, and "(meth)acrylate" means "acrylate", and "methacrylate" corresponding thereto. Furthermore, a description that a polymer particle has "a core polymer" and "a shell polymer" may not mean a structure or a state of having the core polymer and the shell polymer, in the strict meaning. A polymer constituting a core polymer and a polymer constituting a shell polymer may be separated from each other, and a polymer constituting a core polymer may also be covered with a polymer constituting a shell polymer to some degree.

Ink Jet Ink Composition

The ink jet ink composition (hereinafter, briefly referred to as "ink composition") according to the present embodiment, which is used in a recording method including a first step of ejecting the ink jet ink composition from a recording head of head temperature C (unit: ° C.) onto a recording medium to adhere the ink jet ink composition thereonto and a second step of drying the recording medium, on which the ink jet ink composition is adhered, at drying temperature D (unit: ° C.), includes water; and a polymer particle, in which the polymer particle has a core polymer containing a polymer of glass transition temperature A (unit: ° C.) and a shell polymer containing a polymer of glass transition temperature B (unit: ° C.) and covering at least a part of the core polymer, and in which the glass transition temperature A and the glass transition temperature B satisfy Formula (1) below, and the glass transition temperature A and the glass transition temperature B satisfy Formula (2) below in the relation with the head temperature C and the drying temperature D.

$$10 < B - A \quad (1)$$

$$C < B < D \quad (2)$$

The ink composition according to the present embodiment is used in a recording method which includes a first step of ejecting the ink composition from a recording head of head temperature C onto a recording medium to adhere the ink composition thereonto and a second step of drying the recording medium, on which the ink composition is adhered, at drying temperature D. In this recording method, the glass transition temperature A of a polymer contained in the core polymer of the polymer particle and the glass transition temperature B of a polymer contained in the shell polymer of the polymer particle satisfy Formulae (1) and (2) above in the relation with the head temperature C and the drying temperature D, and thus it is possible to achieve both excellent ejection stability and excellent adhesiveness.

That is, by allowing the glass transition temperature B to be higher than the glass transition temperature A by higher than 10° C., it is difficult for the ink composition to be deposited in the recording head, and thus ejection stability is improved. In addition, by allowing the glass transition temperature B to be higher than the glass transition temperature A by higher than 10° C., the friction resistance of an image recorded on the recording medium is improved. Further, by allowing the glass transition temperature A to be lower than the glass transition temperature B by higher than 10° C., the shell polymer is softened by heating after ejecting, and then the core polymer having lower Tg is discharged, and thus the adhesiveness of the ink composition to the recording medium is further improved.

Further, by allowing the glass transition temperature B to be higher than the head temperature C, it is difficult for the shell polymer to be softened by the temperature at the time of ink ejection, and thus it is possible to eject the polymer particles from the recording head without collapsing a core-shell structure. From this point of view, the difference (B–C) between the glass transition temperature B and the head temperature C is preferably 5° C. or higher, and more preferably 10° C. or higher. Meanwhile, B–C is preferably 60° C. or lower, and more preferably 50° C. or lower. That is, B–C is preferably 5° C. to 60° C., and more preferably 10° C. to 50° C.

Further, by allowing the drying temperature D to be higher than the glass transition temperature B, at the time of drying the ink composition adhered on the recording medium, the shell polymer is easily softened. Accordingly, with satisfying Formula (1) above, the core polymer is discharged, and thus the polymers contained in the core polymer and the shell polymer are closely adhered to the recording medium. Thus, a film more strongly adhered to the recording medium is formed. Here, the drying temperature D refers to the surface temperature of the recording medium in the second step. The drying temperature D can be measured by a radiation thermometer. From this point of view, the difference (D–B) between the drying temperature D and the glass transition temperature B is preferably 5° C. or higher, and more preferably 10° C. or higher. Meanwhile, the difference (D–B) is preferably 50° C. or lower, and more preferably 40° C. or lower. That is, the difference (D–B) is preferably 5° C. to 50° C., and more preferably 10° C. to 40° C.

Further, it is preferable that, in the first step, the ink composition according to the present embodiment is used in the recording method in which the recording medium is heated from the side of the recording head. When the recording medium is heated from the side of the recording head, the temperature of the recording head at the time of heating the recording medium is increased, and thus there is a problem in that the polymer in the recording head is easily softened. However, according to the ink composition of the present embodiment, since the Tg of the shell polymer is higher than the temperature of the recording head, the deposition of a polymer tends to be suppressed. In addition, when the recording medium is heated from the side of the recording head, the recording medium can be efficiently heated immediately after the adherence of the ink composition even when the recording medium is thick.

Further, it is preferable that, in the second step, the ink composition according to the present embodiment is used in the recording method in which the drying temperature D is 45° C. to 130° C. The drying temperature D is more preferably 55° C. to 120° C., and still more preferably 70° C. to 110° C. Meanwhile, it is still more preferable that the drying temperature D is higher than the surface temperature E. When the drying temperature D is within the above range, in the ink composition adhered to the recording medium, the shell polymer of the polymer particle is sufficiently softened, and thus the adhesiveness of the ink composition to the recording medium is further improved, and it is possible to perform high-speed printing having good drying properties. In addition, when the drying temperature D is within the above range and Formulae (1) and (2) above are satisfied, it is possible to suppress the softening of the shell polymer at the time of ejecting ink composition, and thus it is possible to maintain the ejection stability of the ink composition. When the drying temperature D is 45° C. to 130° C., high-speed printing of an image having high adhesiveness can be performed while preventing the thermal deformation of the recording medium.

Further, it is preferable that, in the first step, the ink composition according to the present embodiment is used in the recording method in which the surface temperature E (unit: ° C.) of the recording medium is 30° C. to 70° C. The surface temperature E of the recording medium is preferably 30° C. to 70° C., more preferably 30° C. to 60° C., and still more preferably 40° C. to 60° C. When the surface temperature E of the recording medium is within the above range and Formulae (1) and (2) above are satisfied, volatile components, such as moisture, contained in the ink composition can be removed while preventing the shell polymer from being softened immediately after the landing of ink to the recording medium, and thus the bleeding resistance and high-speed printability of the ink composition tend to be further improved while maintaining the ejection stability of the ink composition. When the surface temperature E of the recording medium is 30° C. to 60° C., there is a problem in that the ink in the ink jet head is dried. However, according to the ink composition of the present embodiment, the above problem tends to be suppressed by using a core-shell polymer having high hydrophilicity. Meanwhile, the surface temperature E may be obtained by measuring the temperature of the ejection surface (nozzle plate) formed of a nozzle group of the ink jet head.

It is preferable that the glass transition temperature B satisfies Formula (3) below in the relation with the surface temperature E of the recording medium. When the glass transition temperature B satisfies Formula (3) below and Formulae (1) and (2) above are satisfied, volatile components, such as moisture, contained in the ink composition can be removed while suppressing the discharge of the core polymer due to the softening of the shell polymer immediately after the landing of ink to the recording medium, and thus the bleeding resistance and high-speed printability of the ink composition tend to be further improved while maintaining the ejection stability of the ink composition. In addition, the timing of filming the shell polymer is delayed, and thus volatile components, such as moisture, are previously removed, thereby preventing liquid components from staying in an image after the filming. Therefore, it is possible to prevent the deterioration of adhesiveness and friction resistance. From the same viewpoint as above, the difference (B-E) between the glass transition temperature B and the surface temperature E of the recording medium is preferably 10° C. or higher, and more preferably 15° C. or higher. Meanwhile, the difference (B-E) is preferably 50° C. or lower, and more preferably 40° C. or lower. That is, the difference (B-E) is preferably 10° C. to 50° C., and more preferably 15° C. to 40° C.

$$E<B \qquad (3)$$

Water

The ink composition according to the present embodiment includes water. Examples of water include, but are not limited to, pure water, such as ion exchange water, ultrafiltered water, reverse osmosis water, and distilled water; and ultrapure water. Since this ink composition contains water, it is possible to reduce an organic solvent, and thus it is possible to make an environmentally friendly ink composition.

The content of water is preferably 45 mass % to 75 mass %, more preferably 50 mass % to 70 mass %, and still more preferably 55 mass % to 65 mass %, based on the total mass (100 mass %) of the ink composition. When the content of water is within the above range, ejection stability and adhesiveness tend to be further improved.

Polymer Particle

The ink composition according to the present embodiment contains a polymer particle. The polymer particle is a core-shell polymer particle having a core polymer containing a polymer of glass transition temperature A and a shell polymer containing a polymer of glass transition temperature B and formed on the surface of the core polymer. Here, as shown in Formula (1) above, the difference between the glass transition temperature A and the glass transition temperature B is 10° C. or higher. When this polymer particle is used, before ejecting, it is possible to suppress the softening of the shell polymer in printing nozzles, and thus the ejection stability of the ink composition is excellent. Further, after ejecting, the shell polymer is softened by heating, and then the core polymer is discharged, and thus the adhesiveness of the ink composition to the recording medium and the friction resistance of the film tend to be further improved.

Core Polymer

The Tg (A) of the polymer contained in the core polymer is preferably −10° C. to 60° C. When the glass transition temperature of the core polymer is 60° C. or lower, the shell polymer is softened, and then the core polymer is easily discharged, and thus the adhesiveness of the ink composition is excellent. Further, when the glass transition temperature of the core polymer is −10° C. or higher, the storage stability of the ink composition is excellent. The glass transition temperature of the core polymer is preferably 25° C. to lower than 60° C., and more preferably 30° C. to 55° C.

The polymer contained in the core polymer and the shell polymer to be described later may be a homopolymer or a copolymer. When the polymer contained in the core polymer and the shell polymer to be described later is a homopolymer, as the Tg of the homopolymer, Tg described in various literatures (for example, Polymer Handbook) can be used. Further, when the polymer contained in the core polymer and the shell polymer to be described later is a copolymer, the Tg of the copolymer can be calculated by the following FOX Equation based on $Tg_n$ (unit: K) of various hompolymers and mass fraction ($W_n$) of monomer.

$$\frac{1}{Tg} = \frac{W_1}{Tg_1} + \frac{W_2}{Tg_2} + \ldots + \frac{W_n}{Tg_n}$$

Here, the symbols shown in the Equation are represented as follows.

$W_n$: mass fraction of each monomer
$Tg_n$: Tg of homopolymer of each monomer (unit: K)
$Tg$: Tg of copolymer (unit: K)

Examples of the homopolymer include, but are not particularly limited to, 2-ethylhexyl acrylate homopolymer (Tg: −70° C.), 2-ethylhexyl methacrylate homopolymer (Tg: −10° C.), 2-hydroxyethyl acrylate homopolymer (Tg: −15° C.), 2-hydroxyethyl methacrylate homopolymer (Tg: 55° C.), 2-hydroxybutyl acrylate homopolymer (Tg: −7° C.), 2-hydroxybutyl methacrylate homopolymer (Tg: 26° C.), 2-methoxyethyl acrylate homopolymer (Tg: −50° C.), 4-hydroxybutyl acrylate homopolymer (Tg: −80° C.), iso-octyl methacrylate homopolymer (Tg: −45° C.), iso-butyl acrylate homopolymer (Tg: 43° C.), iso-butyl methacrylate homopolymer (Tg: 53° C.), iso-propyl acrylate homopolymer (Tg: −3° C.), iso-propyl methacrylate homopolymer (Tg: 81° C.), N,N-diethylaminoethyl methacrylate homopolymer (Tg: 20° C.), N,N-dimethyl amino ethyl acrylate homopolymer (Tg: 18° C.), N,N-dimethylaminoethyl methacrylate homopolymer (Tg: 18° C.), N,N-dimethylaminopropyl acrylamide homopolymer (Tg: 134° C.), n-butyl acrylate homopolymer (Tg: −54° C.), tert-butyl acrylate homopolymer (Tg: 43° C.), tert-butyl methacrylate homopolymer (Tg: 20° C.), acrylamide homopolymer (Tg: 179° C.), acrylic acid homopolymer (Tg: 106° C.), acrylonitrile homopolymer (Tg: 125° C.), isoamyl acrylate homopolymer (Tg: −45° C.), iso-butyl acrylate homopolymer (Tg: −26° C.), iso-butyl methacrylate homopolymer (Tg: 48° C.), isobornyl acrylate homopolymer (Tg: 94° C.), isobornyl methacrylate homopolymer (Tg: 155° C. to 180° C.), itaconic acid homopolymer (Tg: 100° C.), ethyl acrylate homopolymer (Tg: −22° C. to −24° C.), ethyl carbitol acrylate homopolymer (Tg: −67° C.), ethyl methacrylate homopolymer (Tg: 65° C.), ethoxy ethyl acrylate homopolymer (Tg: −50° C.), ethoxy ethyl methacrylate homopolymer (Tg: 15° C.), ethoxy diethylene glycol acrylate homopolymer (Tg: −70° C.), octyl acrylate homopolymer (Tg: −65° C.) iso-octyl acrylate homopolymer (Tg: −70° C.), cyclohexyl acrylate homopolymer (Tg: 15° C. to 19° C.), cyclohexyl methacrylate homopolymer (Tg: 66° C. to 83° C.), dicyclopentanyl acrylate homopolymer (Tg: 120° C.), dicyclopentanyl methacrylate homopolymer (Tg: 175° C.), styrene homopolymer (Tg: 100° C.), stearyl acrylate homopolymer (Tg: 35° C.), tertiary butyl acrylate homopolymer (Tg: 41° C.), tertiary butyl methacrylate homopolymer (Tg: 107° C.), tetradecyl acrylate homopolymer (Tg: 24° C.), tetradecyl methacrylate homopolymer (Tg: −72° C.), tetrahydrofurfuryl acrylate homopolymer (Tg: −12° C.), tetrahydrofurfuryl methacrylate homopolymer (Tg: 60° C.), nonyl acrylate homopolymer (Tg: 58° C.), phenoxy ethyl acrylate homopolymer (Tg: −22° C.), phenoxy ethyl methacrylate homopolymer (Tg: 54° C.), butyl acrylate homopolymer (Tg: 56° C.), butyl methacrylate homopolymer (Tg: 20° C.), propyl acrylate homopolymer (Tg: 3° C.), propyl methacrylate homopolymer (Tg: 35° C.), hexadecyl acrylate homopolymer (Tg: 35° C.), hexadecyl methacrylate homopolymer (Tg: 15° C.), hexyl acrylate homopolymer (Tg: −57° C.), hexyl methacrylate homo polymer (Tg: −5° C.), benzyl acrylate homopolymer (Tg: 6° C.), benzyl methacrylate homopolymer (Tg: 54° C.), pentyl acrylate homopolymer (Tg: 22° C.), pentyl methacrylate homopolymer (Tg: −5° C.), maleic acid homopolymer (Tg: 130° C.), methacrylic acid homopolymer (Tg: 185° C.) carboxyethyl acrylate homopolymer (Tg: 37° C.), methyl acrylate homopolymer (Tg: 8° C.), methyl methacrylate homopolymer (Tg: 105° C.), methoxy ethyl acrylate homopolymer (Tg: −50° C.), methoxy methacrylate homopolymer (Tg: −16° C.), lauryl acrylate homopolymer (Tg: −3° C. to 15° C.), lauryl methacrylate homopolymer (Tg: −65° C.), and vinyl acetate homopolymer (Tg: 32° C.) Here, Tg is not limited to above because it may be changed depending on the manufacturing method and stereoregularity of the homopolymer.

When the polymer is a homopolymer, the Tg (A) of the polymer contained in the core polymer can be controlled by selecting its homopolymer. Further, when the polymer is a copolymer, the Tg (A) thereof can be controlled by considering the Tg of the above homopolymer and the above FOX Equation.

The polymer contained in the core polymer is not particularly limited to, but is preferably a polymer having at least one of a hydrophilic (meth)acrylate monomer unit, a hydrophobic (meth)acrylate monomer unit having an alkyl group of 3 or more carbon atoms, a hydrophobic (meth) acrylate monomer unit having a cyclic structure, a (meth) acrylamide monomer unit or N-substituted derivative thereof, an aromatic vinyl compound monomer unit, and a carboxylic acid monomer unit. Among these, a polymer having a hydrophobic (meth)acrylate having an alkyl group of 3 or more carbon atoms or a polymer having an aromatic vinyl compound is preferable.

Examples of the hydrophilic (meth)acrylate monomer include, but are not limited to, methyl (meth)acrylate, ethyl (meth)acrylate, α-hydroxymethyl (meth)acrylate, 2-hydroxyethyl (meth)acrylate, (poly)ethyleneglycol (meth) acrylate, methoxy(poly)ethylene glycol (meth)acrylate, ethoxy(poly)ethyleneglycol (meth)acrylate, and (poly)propyleneglycol (meth)acrylate. Among these, methyl (meth) acrylate and ethyl (meth)acrylate are preferable. Here, the "hydrophilicity" means that the solubility in 100 mL of water (20° C.) is 0.3 g or more.

Examples of the hydrophobic (meth)acrylate monomer having an alkyl group of 3 or more carbon atoms include, but are not limited to, (meth)acrylates having an alkyl group of 3 or more carbon atoms, such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth) acrylate, lauryl (meth)acrylate, stearyl (meth)acrylate, cetyl (meth)acrylate, neopentyl (meth)acrylate, behenyl (meth) acrylate, and the like. Among these, lauryl (meth)acrylate is preferable. Here, the "hydrophobicity" means that the solubility in 100 mL of water (20° C.) is less than 0.3 g.

Examples of the hydrophobic (meth)acrylate monomer having a cyclic structure include, but are not limited to, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, norbornyl (meth) acrylate, adamantyl (meth)acrylate, and tetrahydrofurfuryl (meth)acrylate.

Examples of the (meth)acrylamide monomer or the N-substituted derivative thereof include, but are not limited to, (meth)acrylamides or N-substituted derivatives thereof, such as (meth)acrylamide, N-hydroxymethyl (meth)acrylamide, diacetone acrylamide, N,N-dimethyl acryl(meth) amide, and the like.

Examples of the aromatic vinyl compound monomer include, but are not limited to, styrene, α-methyl styrene, p-methyl styrene, vinyl toluene, chlorostyrene, and divinyl benzene.

Examples of the carboxylic acid monomer include, but are not limited to, (meth)acrylic acid, crotonic acid, maleic acid, fumaric acid, and itaconic acid. Among these, (meth)acrylic acid is preferable. Here, the "carboxylic acid monomer unit" refers to a polymerizable monomer unit having a carboxyl group and a polymerizable unsaturated group.

The above monomers may be used alone or in a combination of two or more thereof.

It is preferable that the core polymer is designed to be a polymer having high hydrophobicity. Therefore, it is preferable that the core polymer does not have an acid value. In addition, it is preferable that the core polymer contains at least an aromatic vinyl compound monomer as a constitutional unit. Therefore, the core polymer becomes hydrophobic, and thus a hydrophobic film can be formed. As a result, it is possible to improve water friction resistance that is one type of the friction resistance of a recorded image.

Among all the repeating units constituting the polymer contained in the core polymer, the content of the repeating unit derived from the hydrophobic monomer is preferably 80 mass % or more, and more preferably 90 mass % or more. When the content of the repeating unit derived from the hydrophobic monomer is within the above range, a hydrophobic film is formed on the surface of an image recorded on a recording medium by performing heat treatment or the like, and thus the friction resistance of the image tends to be further improved.

The polymers contained in the core polymer may be used alone or in a combination of two or more thereof. When the polymers contained in the core polymer are two or more kinds of polymers, the glass transition temperature of the polymer having the highest glass transition temperature is set to glass transition temperature A.

Shell Polymer

The Tg (B) of the polymer contained in the shell polymer is preferably 50° C. or higher, and more preferably 60° C. or higher. In addition, the Tg (B) of the polymer contained in the shell polymer is preferably 120° C. or lower, and more preferably 90° C. or lower. When the Tg (B) of the polymer contained in the shell polymer is 120° C. or lower, the shell polymer is easily softened on the recording medium, and thus the adhesiveness of the ink composition tends to be more excellent. Further, in the case where the ink composition is preheated at the time of ejecting the ink composition, when the Tg (B) of the polymer contained in the shell polymer is 50° C. or higher, the polymer particles can be ejected from a recording head without collapsing a core-shell structure, and the deposition of the polymer particles in the printing nozzles can be more suppressed, and thus the ejection stability of the ink composition tends to be more excellent.

In addition, it is preferable that the polymer contained in the shell polymer is a polymer having a (meth)acrylate monomer unit and a carboxylic acid monomer unit. When such a polymer is used, it is possible to allow a carboxyl group to be present on the surface of the shell polymer. Therefore, the dispersion stability of the polymer particles is further improved, and the viscosity of the ink composition becomes relatively low, and thus the ejection stability of the ink composition tends to be further improved. The (meth)acrylate monomer unit is not particularly limited, but examples thereof include a hydrophilic (meth)acrylate monomer unit (for example, a monomer unit having an alkyl group of 1 or 2 carbon atoms), a hydrophobic (meth)acrylate monomer unit having an alkyl group of 3 or more carbon atoms, and a hydrophobic (meth)acrylate monomer unit having a cyclic structure. Specific examples of the (meth)acrylate monomer unit and the carboxylic acid monomer unit are the same as those of the above-mentioned monomer units constituting the polymer contained in the core polymer. These monomers may be used alone or in a combination of two or more thereof.

Among all the repeating units constituting the polymer contained in the shell polymer, the content of the repeating units derived from the (meth)acrylic acid ester and the unsaturated carboxylic acid is preferably 20 mass % or more, more preferably 30 mass % or more, and still more preferably 35 mass % or more.

Among all the repeating units constituting the polymer contained in the shell polymer, the content of the repeating unit derived from the hydrophilic monomer is preferably 20 mass % or more, more preferably 30 mass % or more, and still more preferably 35 mass % or more. When the content of the repeating unit derived from the hydrophilic monomer is within the above range, the affinity of the shell polymer for water is improved, and thus the dispersion stability of the polymer particles in the ink composition tends to be improved. In addition, since it is possible to more effectively suppress the adherence of the polymer particles to nozzles, the ejection stability of the ink composition from the nozzles of a recording head tends to be better.

Among all the repeating units constituting the polymer contained in the shell polymer, the content of the repeating unit derived from the hydrophobic monomer is preferably 10 mass % or more, more preferably 20 mass % or more, and still more preferably 30 mass % or more. By setting the content of the repeating unit derived from the hydrophobic monomer to be within the above range, even when the occupancy rate of an organic solvent is increased due to the drying of water in the recording head and on the recording medium, the dispersion of the polymer particles is stable, and the aggregation of the polymer particles tends to be able to be suppressed. As the hydrophobic monomer, an aromatic vinyl monomer is preferable.

The polymers contained in the shell polymer may be used alone or in a combination of two or more thereof. When the polymers contained in the shell polymer are two or more kinds of polymers, the glass transition temperature of the polymer having the lowest glass transition temperature is set to glass transition temperature B.

The average particle diameter of the polymer particles is preferably 10 nm to 100 nm, and more preferably 10 nm to 80 nm. When the average particle diameter of the polymer particles is relatively small, the gloss of the recorded image easily appears, and excellent film forming properties are exhibited. In addition, when the average particle diameter of the polymer particles is relatively small, a large lump is hardly formed even when the polymer particles are aggregated, and thus it is possible to suppress the clogging of nozzles. Further, when the average particle diameter of the polymer particles is small, the viscosity of the ink composition can be increased relatively high, and thus it is possible to prevent the viscosity of the ink composition from being lowered to such a degree that ink ejection properties becomes unstable, even when the temperature of the ink composition rises in the recording head. The average particle diameter is based on volume unless otherwise specified. As a measuring method, for example, the average particle diameter can be measured by a particle size distribution analyzer using a laser diffraction scattering method as a measurement principle. An example of the particle size distribution analyzer includes a particle size distribution meter (for example, Microtrac UPA, manufactured by Nikkiso Co., Ltd.) using a dynamic light scattering method as a measurement principle.

The ratio (c/s) of the mass (c) of the core polymer to the mass (s) of the shell polymer in the polymer particle is preferably 0.4 to 4.0, more preferably 0.5 to 2.5, and particularly preferably 0.6 to 2.0. When the polymer particle satisfies the relation of $(c/s)/\phi \geq 0.01$, the balance between the mass of the core polymer and the mass of the shell polymer becomes good regardless of the size of the polymer particles, and thus the ejection stability of the ink composition and the friction resistance of an image recorded on a recording medium tend to be improved together.

It is particularly preferable that the polymers constituting the core polymer or shell polymer of the above-described polymer particle are non-crosslinked. When the polymers are non-crosslinked, the ejection stability of the ink composition tends to be further improved. The degree of cross-linkage of the polymers can be quantified by measuring the gel fraction of the polymers using tetrahydrofuran (THF) (hereinafter, referred to as "THF gel fraction"). The THF gel fraction of the polymer particles is preferably 10% or less, and more preferably 5% or less. When the THF gel fraction of the polymer particles is within the above range, the friction resistance of an image recorded on a recording medium tends to be more improved.

For example, the THF gel fraction can be measured as follows. About 10 g of core-shell polymer particles are weighed and put on a Teflon (registered trademark) petri dish, and then dried at 120° C. for 1 hour to form a film. The obtained film is dipped into THF at 20° C. for 24 hours, filtered by a filter of 100 meshes, and then dried again at 20° C. for 24 hours. THF gel fraction (%) can be obtained by Equation below:

$$THF\ gel\ fraction\ (\%)=(mass\ after\ re\text{-}drying/original\ mass) \times 100$$

The content (solid basis) of the polymer particles in the ink composition is preferably 0.5 mass % to 20 mass %, more preferably 0.6 mass % to 15 mass %, and still more preferably 0.7 mass % to 10 mass %, based on the total mass (100 mass %) of the ink composition. When the content of the polymer particles is 0.5 mass % or more, friction resistance and adhesiveness tend to be more excellent. When the content of the polymer particles is 20 mass % or less, ejection stability tends to be more excellent.

Here, in the core-shell polymer particle in the present specification, a polymer forming a core polymer may be localized in the core polymer and a polymer forming a shell polymer may be localized in the shell polymer, or the core-shell polymer particle may be a polymer particle in which a boundary between a core polymer and a shell polymer is not exactly clear.

Synthesis Method of Polymer Particle

A method of synthesizing a polymer particle is not particularly limited, but a polymer particle can be easily synthesized by known emulsion polymerization methods or appropriate combinations thereof. Specific examples thereof include a batch mixing polymerization method, a monomer dropping method, a pre-emulsion method, a seed emulsion polymerization method, a multi-stage emulsion polymerization method (two-stage emulsion polymerization method, or the like), a phase-inversion emulsion polymerization method, and the like. From the viewpoint of the average particle diameter of the polymer particles being able to be made very small, an emulsifier-free polymerization method is preferable.

A polymerization method of previously synthesizing a core polymer is described. First, a core particle is synthesized by a general emulsion polymerization method using an aqueous medium. The conditions of emulsion polymerization may be determined according to a known method. For example, when the total amount of monomers used is set to 100 parts, the polymerization can be generally performed using 100 parts to 500 parts of water (aqueous medium). Polymerization temperature is preferably −10° C. to 100° C., more preferably −5° C. to 100° C., and still more preferably 0° C. to 90° C. Polymerization time is preferably 0.1 hours to 30 hours, and more preferably 2 hours to 25 hours. As the method of emulsion polymerization, a batch method of collectively preparing monomers, a method of separately or continuously supplying monomers, a method of separately or continuously adding pre-emulsion of monomers, or a method in which these methods are combined in a stepwise manner can be employed. If necessary, a polymerization initiator, a molecular weight adjuster, an emulsifier, or the like, which is used in general emulsion polymerization, can be used alone or in a combination of two or more thereof.

The polymerization initiator is not particularly limited, but examples thereof include persulfates, such as potassium persulfate and ammonium persulfate; organic peroxides, such as diisopropylperoxy dicarbonate, benzoyl peroxide, lauroyl peroxide, and tert-butylperoxy-2-ethylhexanoate; azo compounds, such as azobisisobutyronitrile, dimethyl-2,2′-azobisisobutyrate, and 2-carbamoylazaisobutyronitrile; and redox-based compounds that are obtained by combining reductants, such as a radical emulsifier containing a radical emulsifiable compound having a peroxide group, sodium hydrogen sulfite, and ferrous sulfate. These polymerization initiators may be used alone or in a combination of two or more thereof.

The molecular weight adjuster is not particularly limited, but examples thereof include mercaptans, such as n-hexyl mercaptan, n-octyl mercaptan, n-dodecyl mercaptan, t-dodecyl mercaptan, n-hexadecyl mercaptan, n-tetradecyl mercaptan, t-tetradecyl mercaptan, and thioglycolic acid; xanthogen disulfides, such as dimethyl xanthogen disulfide, diethyl xanthogen disulfide, and diisopropyl xanthogen disulfide; thiuram disulfides, such as tetramethyl thiuram disulfide, tetraethyl thiuram disulfide, and tetrabutylthiuram disulfide; halogenated hydrocarbons, such as chloroform, carbon tetrachloride, carbon tetrabromide, and ethylene bromide; hydrocarbons, such as pentaphenyl ethane and α-methyl styrene dimer; and acrolein, methacrolein, allyl alcohol, 2-ethylhexyl thioglycolate, terpinolene, α-terunepin, γ-terunepin, dipentene, and 1,1-diphenyl ethylene. These molecular weight adjusters may be used alone or in a combination of two or more thereof.

The emulsifier is not particularly limited, but examples thereof include anionic surfactants, such as alkyl sulfate ester salt and alkyl benzene sulfonate; nonionic surfactants, such as alkyl esters of polyethylene glycol, alkyl ethers of polyethylene glycol, and alkyl phenyl ethers of polyethylene glycol; reactive emulsifiers having a hydrophilic group, a hydrophobic group, and a radical reactive group; and polymer emulsifiers in which a hydrophilic group is introduced into a polymer such as vinyl-based polymer or a polyester-based polymer. These emulsifiers may be used alone or in a combination of two or more thereof. Here, the hydrophilic group refers to an atomic group having high affinity for water, and examples thereof include a nitro group, a hydroxyl group, an amino group, a carboxyl group, and a sulfonate group. In addition, the hydrophobic group refers to an atomic group having lower affinity for water than that of the hydrophilic group, and examples thereof include a linear or branched alkyl group, an alicyclic group, an aromatic ring group, an alkyl silyl group, and a perfluoroalkyl group.

Next, in the presence of the obtained core particles (core polymer), monomers for a shell polymer are polymerized. Specifically, the monomers for a shell polymer are seed-polymerized while using the obtained core particles as seed particles, thereby forming core-shell polymer particles. For example, the monomers for a shell polymer or pre-emulsion thereof may be collectively, separately or continuously dropped into an aqueous medium in which core particles are dispersed. In this case, the amount of the core particles used is preferably 25 parts by mass to 250 parts by mass based on 100 parts by mass of the monomers for a shell polymer. When a polymerization initiator, a molecular weight modifier, an emulsifier, or the like is used at the time of polymerization, the same additives as those used in the manufacturing the core particles can be used. Further, the polymerization conditions, such as polymerization time, may also be the same as those used in the manufacturing the core particles.

A polymerization method of previously synthesizing a shell polymer is described. First, a shell polymer is synthesized. Specifically, a pre-emulsion solution containing the above-described hydrophilic monomers is prepared using a reactive emulsifier, and this pre-emulsion solution is dropped into an aqueous medium together with a polymerization initiator to cause a polymerization reaction, thereby synthesizing a shell polymer.

Next, the core polymer is polymerized in a state in which the obtained shell polymer is set as a polymerization field to synthesize the polymer particle according to the present embodiment. Specifically, a monomer mixture containing the above-described hydrophobic monomers is dropped into an aqueous medium containing the shell polymer to polymerize the core polymer to obtain a polymer particle. Here, when the shell polymer is used as a polymerization field, since the monomer mixture is not required to contain an emulsifier, the monomer mixture can be dropped in the form of a monomer oil droplet.

According to such a multi-stage emulsion polymerization, a shell polymer can be synthesized using a reactive emulsifier, and a core polymer can be synthesized without using an emulsifier, and thus the content of an emulsifier in the ink composition can be easily set to be 0.01 mass % or less. When the content of an emulsifier contained in the ink composition is 0.01 mass % or less, the aggregation of ink components in the ink interface (gas-liquid interface in ink-atmosphere, or solid-liquid interface in ink-ink contact member such as ink container) can be suppressed, and storage stability is excellent, and thus which is preferable. In addition, when the content of an emulsifier contained in the ink composition is 0.01 mass % or less, foaming properties and defoaming properties are excellent, and thus an ink container having an ink fillable inlet can be preferably used. Here, the "ink container having an ink fillable inlet" refers to an ink container having an attachable and detachable or openable and closable inlet. This ink container is configured such that a user can easily inject the ink composition, whereas foam easily occurs at the time of injection. Here, when the opening area of the inlet is 20 mm or more, the ink composition is easily charged into the ink container, and thus which is preferable. Such an ink container is disclosed, for example, in JP-A-2005-219483 and JP-A-2012-51309.

Even when a polymer particle is synthesized using a large amount of an emulsifier, excess emulsifier is removed after the synthesis of the polymer particle, and thus the content of an emulsifier contained in the ink composition may be set to be 0.01 mass % or less.

Finally, the resultant is neutralized with a base such as sodium hydroxide, potassium hydroxide, or ammonia to adjust pH, and, if necessary, filtered, thereby obtaining a core-shell polymer particle dispersion.

Color Material

It is preferable that the ink composition contains a color material. The color material is not particularly limited, but examples thereof include pigments and dyes.

Inorganic pigments are not particularly limited, but examples thereof include carbon blacks (C.I. Pigment Black 7) such as furnace black, lamp black, acetylene black, and channel black; iron oxides; and titanium oxides.

Organic pigments are not particularly limited, but examples thereof include quinacridone-based pigments, quinacridonequinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments.

The pigments may be used alone or in a combination of two or more thereof.

The content of the pigment is preferably 0.5 mass % to 15 mass %, more preferably 1 mass % to 10 mass %, and still more preferably 1 mass % to 5 mass %.

Surfactant

It is preferable that the ink composition contains a surfactant. The surfactant is not particularly limited, but examples thereof include an acetylene glycol-based surfactant, a fluorine-based surfactant, and a silicone-based surfactant. When the ink composition contains these surfactants, the wettability of the ink composition adhered to the recording medium tends to be further improved.

The acetylene glycol-based surfactant is not particularly limited, but, for example, is preferably one or more selected from alkylene oxide adducts of 2,4,7,9-tetramethyl-5-decyne-4,7-diol and 2,4,7,9-tetramethyl-5-decyne-4,7-diol; and alkylene oxide adducts of 2,4-dimethyl-5-decyne-4-ol and 2,4-dimethyl-5-decyne-4-ol. Commercially available products of the acetylene glycol-based surfactant are not particularly limited, but examples thereof include E series such as Olfine 104 series and Olfine E1010 (all are trade names, manufactured by Air Products Japan, Inc.), and Surfynol 465, and Surfynol 61 (all are trade names, manufactured by Nissin Chemical Industry Co., Ltd.). These acetylene glycol-based surfactants may be used alone or in a combination of two or more thereof.

The fluorine-based surfactant is not particularly limited, but examples thereof include perfluoroalkyl sulfonates, perfluoroalkyl carboxylates, perfluoroalkyl phosphate esters, perfluoroalkyl ethylene oxide adducts, perfluoroalkyl betaine, and perfluoroalkyl amine oxide compounds. Commercially available products of the fluorine-based surfactant are not particularly limited, but examples thereof include S-144 and S-145 (manufactured by Asahi Glass Co., Ltd.); FC-170C, FC-430, and Fluorad-FC4430 (manufactured by Sumitomo 3M Limited); FSO, FSO-100, FSN, FSN-100, and FS-300 (manufactured by Dupont, Ltd.); and FT-250 and FT-251 (manufactured by Neos Co., Ltd.). These fluorine-based surfactants may be used alone or in a combination of two or more thereof.

Examples of the silicone-based surfactant include polysiloxane-based compounds, polyether-modified organosiloxane, and the like. Commercially available products of the silicone-based surfactant are not particularly limited, but specific examples thereof include BYK-306, BYK-307, BYK-333, BYK-341, BYK-345, BYK-346, BYK-347, BYK-348, and BYK-349 (all are trade names, manufactured by BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade names, manufactured by Shin-Etsu chemical Co., Ltd.).

The content of the surfactant in the ink composition is preferably 0.1 mass % to 5 mass %, and more preferably 0.1 mass % to 3 mass %, based on the total mass (100 mass %) of the ink composition. When the content of the surfactant is within the above range, the wettability of the ink composition adhered to the recording medium tends to be further improved.

Penetrant

It is preferable that the ink composition further contains a penetrant. When the ink composition quickly penetrates (or wetted and spread) into a recording medium, it is possible to obtain recorded matter having high bleeding resistance and low unevenness.

The penetrant is not particularly limited, but preferable examples thereof include alkyl ethers of polyhydric alcohols (glycol ethers) and alkyl diols having 3 to 8 carbon atoms. The glycol ethers are not particularly limited, but examples thereof include ethylene glycol monomethyl ether, ethylene glycol monoethyl ether, ethylene glycol mono propyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxy butanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether.

The alkyl diols having 3 to 8 carbon atoms are not particularly limited, but examples thereof include 1,2-pentanediol, 1,2-hexanediol, 1,2-propanediol, 1,3-propanediol, 1,4-butanediol, 1,5-pentanediol, 1,6-hexanediol, 1,7-heptanediol, 1,8-octanediol, 3-methyl-1,5-pentanediol, and 2-ethyl-1,3-hexanediol.

These penetrants may be used alone or in a combination of two or more thereof.

The content of the penetrant in the ink composition is preferably 0.1 mass % to 20 mass %, and more preferably 0.5 mass % to 10 mass %, based on the total mass (100 mass %) of the ink composition. When the content of the penetrant is 0.1 mass % or more, it is possible to increase the degree of penetration of the ink composition into the recording medium. Meanwhile, when the content of the penetrant is 20 mass % or less, the occurrence of image bleeding and unevenness can be prevented, and the increase in viscosity of the ink composition tends to be further suppressed.

Cyclic Amide Compound

It is preferable that the ink composition further contains a cyclic amide compound. When the ink composition contains a cyclic amide compound, the stability of polymer particles can be improved, and the precipitation of foreign matter in the ink composition can be effectively prevented, and thus storage stability, particularly, storage stability at high temperature tends to be more excellent.

In addition, since the cyclic amide compound also has moisturizing performance, it is possible to prevent polymer particles and other components from being aggregated and solidified by the evaporation of moisture at the time of storing the ink composition. In this case, the clogging around the nozzles of a head can be prevented at the time of ink jet recording, and thus the ejection stability of the ink composition tends to be more excellent.

The cyclic amide compound is not particularly limited, but examples thereof include 2-pyrrolidone, N-methyl-2-pyrrolidone, and N-ethyl-2-pyrrolidone. Among these, 2-pyrrolidone is preferable. These cyclic amide compounds may be used alone or in a combination of two or more thereof.

The content of the cyclic amide compound in the ink composition is preferably 0.5 mass % to 5 mass %, and more preferably 1 mass % to 3 mass %, based on the total mass (100 mass %) of the ink composition. When the content of the cyclic amide compound is within the above range, the long-term storage stability and ejection stability of the ink composition and the friction resistance of recorded matter due to the excellent adhesiveness of the ink composition tend to be more excellent.

Other Components

The ink composition can be appropriately added with various additives, such as a solvent, a moisturizing agent, a dissolution aid, a viscosity modifier, a pH adjuster, an antioxidant, a preservative, a fungicide, a corrosion inhibitor, and a chelating agent for capturing metal ions influencing dispersion, in order to well maintain the storage stability of the ink composition and the ejection stability of the ink composition from a head, to improve clogging, or to prevent the deterioration of the ink composition.

Surface Tension

The surface tension of the ink composition at 25° C. is preferably 20 mPa·s to 50 mPa·s, and more preferably 20 mPa·s to 40 mPa·s. When the surface tension thereof is within the above range, ejection stability tends to be better. The surface tension thereof can be measured using a surface tensiometer of Wilhelmy method.

Viscosity

The viscosity of the ink composition at 25° C. is preferably 20 mPa·s or less, and more preferably 10 mPa·s or less. When the viscosity thereof is within the above range, ejection stability tends to be better. The viscosity thereof can be measured using a viscometer.

Recording Medium

The recording medium is not particularly limited, but preferable examples thereof include an absorptive recording medium, a low-absorptive recording medium, and a non-absorptive recording medium.

The absorptive recording medium is not particularly limited, but examples thereof include plain paper such as electrophotographic paper having high ink composition permeability, ink jet paper, art paper having relatively low ink composition permeability and used in general offset printing, coat paper, and cast paper. The ink jet paper is not particularly limited, but a specific example thereof includes paper including an ink absorbing layer composed of silica particles and alumina particles or an ink absorbing layer composed of a hydrophilic polymer such as polyvinyl alcohol (PVA) or polyvinyl pyrrolidone (PVP).

The low-absorptive recording medium is not particularly limited, but an example thereof includes coated paper in which a coating layer for receiving an oil-based ink composition is provided on the surface. The coated paper is not particularly limited, but examples thereof include printing papers such as art paper, coat paper, and matte paper.

The non-absorptive recording medium is not particularly limited, but examples thereof include a film or plate made of plastics such as polyvinyl chloride, polyethylene, polypropylene, and polyethylene terephthalate (PET); a plate made of metals such as iron, silver, copper, and aluminum; a metal plate or a plastic-made film fabricated by the deposition of these various metals; a plate made of an alloy of stainless steel or brass; and the like.

Here, each of the "low-absorptive recording medium" and "non-absorptive recording medium" may be a recording medium having an amount of water absorption of 10 mL/m$^2$ or less during the period of time from the start of contact to 30 msec in Bristow's method. This Bristow's method is the most common method as a method of measuring the amount of liquid absorption in a short period of time and is also employed in Japan Technical Association of the Pulp and Paper Industry (JAPAN TAPPI). The details of the test method are described in Standard No. 51, "Paper and Paperboard—Liquid Absorbency Test Method—Bristow's method" of "JAPAN TAPPI Paper Pulp Test Methods, 2000 version".

In addition, the non-absorptive recording medium or the low-absorptive recording medium can also be classified in accordance with wettability of water on a recording surface. For example, the recording medium can be characterized by dropping 0.5 μL of a water droplet onto the recording surface of the recording medium to measure the reduction rate of a contact angle (comparing a contact angle at 0.5 msec after landing to a contact angle at 5 sec after the landing). More specifically, as characteristics of the recording medium, the non-absorbency of the "non-absorptive recording medium" indicates that the above-described reduction rate is lower than 1% and the low-absorbency of the "low-absorptive recording medium" indicates that the above-described reduction rate is 1% or higher and lower than 5%. In addition, the absorbency indicates that the above-described reduction rate is 5% or higher. It is possible to measure the contact angle using Portable Contact Angle Meter PCA-1 (manufactured by Kyowa Interface Science Co., Ltd.) or the like.

Recording Apparatus

The recording apparatus according to the present embodiment includes a recording head for ejecting the ink composition onto a recording medium; a head heating unit for heating the recording head to head temperature C; and a drying unit for drying the recording medium, on which the ink jet ink composition is adhered, at drying temperature D. This recording apparatus may further have the above-mentioned ink jet ink composition.

Figure 1:
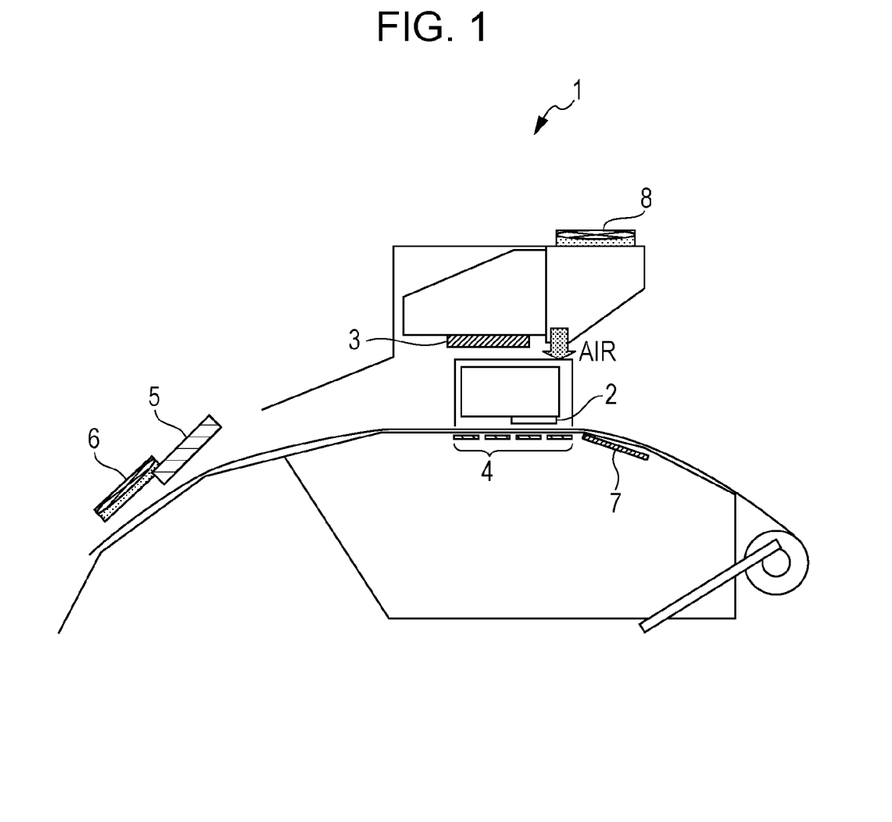
FIG. 1 is a schematic cross-sectional view showing the configuration of a recording apparatus according to the present embodiment.

FIG. 1 is a schematic cross-sectional view of a recording apparatus according to the present embodiment. As shown in FIG. 1, the recording apparatus 1 includes a recording head 2, an IR heater 3, a platen heater 4, a curing heater 5, a cooling fan 6, a preheater 7, and a ventilation fan 8.

The recording head 2 ejects the ink composition onto the recording medium. As the recording head 2, a recording head known in the related art can be used. Examples thereof include a recording head for ejecting liquid droplets using the vibration of a piezoelectric element, that is, a recording head for forming ink droplets by mechanical deformation of an electrostrictive element.

The head heating unit serves to heat the recording head 2 to head temperature C. The head heating unit is not particularly limited, but examples thereof include a unit for directly heating the recording head 2 by hot air or the IR heater 3 and a unit for heating the recording head 2 through the recording medium heated by the platen heater 4. When the recording head 2 is heated, the viscosity of the ink composition in the recording head 2 is lowered, and thus the ink composition can be easily ejected. Further, since glass transition temperature B and head temperature C satisfy Formula (2) above, the shell polymer of the polymer particle in the recording head 2 is hardly softened, and thus the deposition of polymer particles in the recording head 2 can be suppressed.

In addition, when the IR heater 3 is used, the recording medium can be heated from the side of the recording head 2. Therefore, the recording head 2 is also heated simultaneously, but the temperature of the recording medium can be increased without being affected by the thickness of the recording medium, compared to when the recording medium is heated from the back side thereof by the platen heater 4 or the like. Further, when the platen heater 4 is used, the recording medium can be heated from the side opposite to the side of the recording head 2. Thus, the recording head 2 becomes relatively difficult to heat.

Preferably, at the time of ejecting the ink composition onto the recording medium, the recording apparatus 1 further includes a recording medium heating unit for heating a recording medium such that the surface temperature E of the recording medium is 30° C. to 60° C. The recording medium heating unit is not particularly limited, but examples thereof include the IR heater 3 and a platen heater 4. When the recording apparatus 1 includes the recording medium heating unit, the ink composition adhered to the recording medium can be more rapidly dried, and bleeding can be further suppressed.

The drying unit serves to heat and dry the recording medium, to which the ink jet ink composition is adhered, to drying temperature D. The drying unit is not particularly limited, but examples thereof include the curing heater 5, a hot air mechanism (not shown), a thermostatic bath (not shown), and the like. When the drying unit heats the recording medium on which an image is recorded, moisture or the like contained in the ink composition is more rapidly evaporated and scattered, and thus a film is formed by the polymer particles contained in the ink composition. In this way, the dried ink composition is strongly fixed (adhered) on the recording medium, and thus a high-quality image having excellent friction resistance can be obtained in a short time.

Here, the above described "heating the recording medium" refers to raising the temperature of the recording medium to a desired temperature, and is not limited to directly heating of the recording medium.

The recording apparatus 1 may have the cooling fan 6. When the ink composition on the recording medium is cooled by the cooling fan 6 after the drying, a film having excellent adhesiveness tends to be able to be formed on the recording medium.

In addition, the recording apparatus 1 may include the preheater 7 for previously heating (preheating) the recording medium before the ejection of the ink composition onto the recording medium. When the recording medium is preheated before the ejection of the ink composition, bleeding hardly occurs on the recording medium, particularly a non-absorptive or low-absorptive recording medium, and thus it is possible to form a high-quality image. Preheating temperature is preferably 80° C. to 120° C.

Further, the recording apparatus 1 may include the ventilation fan 8 for more efficiently drying the ink composition adhered to the recording medium.

Recording Method

The recording method according to the present embodiment includes a first step of ejecting an ink composition from a recording head of head temperature C onto a recording medium to adhere the ink composition thereonto; and a second step of drying the recording medium, on which the ink composition is adhered, at drying temperature D. Here, the ink composition contains water and a polymer particle, the polymer particle has a core polymer containing a polymer of glass transition temperature A and a shell polymer containing a polymer of glass transition temperature B and formed on the surface of the core polymer, and the glass transition temperature A, the glass transition temperature B, the head temperature C, and the drying temperature D satisfy Formulae (1) and (2) above.

Hereinafter, the recording method using the above-described recording apparatus 1 according to the present embodiment will be described.

First Step

Figure 2:
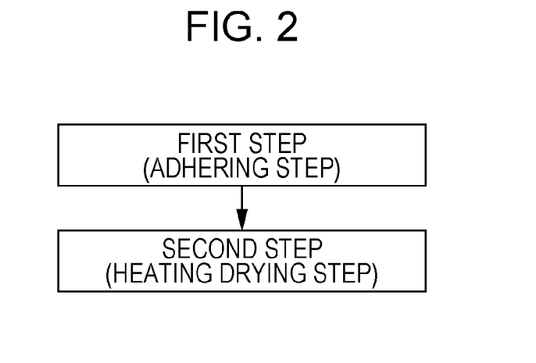
FIG. 2 is a flowchart of a recording method according to the present embodiment.

FIG. 2 shows a flowchart of a recording method according to the present embodiment. As shown in FIG. 2, the recording method according to the present embodiment includes a first step and a second step. The first step is a step of ejecting the above-described ink composition from a recording head 2 of head temperature C onto a recording medium to adhere the ink composition thereonto. In this case, the viscosity of the ink composition in the recording head 2 is lowered, and thus the ink composition can be easily ejected. In addition, since glass transition temperature B and head temperature C satisfy Formula (2) above, the deposition of polymer particles in the recording head 2 can be suppressed without softening the shell polymer of the polymer particle in the ink composition in the recording head 2, thereby improving ejection stability. Head temperature C is set to be lower than glass transition temperature B, and the difference (B–C) between glass transition temperature B and head temperature C is preferably 5° C. or higher, and more preferably 10° C. or higher. Meanwhile, B–C is preferably 60° C. or lower, and more preferably 50° C. or lower. That is, B–C is preferably 5° C. to 60° C., and more preferably 10° C. to 50° C.

Here, as the ink composition, the above-described ink composition can be used.

In the first step, it is preferable that the recording medium is heated from the side of the recording head 2. In the case where the recording medium is thick, when the recording medium is heated from the side of the recording head 2 using the IR heater 3, the ink composition is easily and more rapidly dried, compared to when the recording medium is heated from a side opposite to the ink-adhered side of the recording medium using the platen heater 4.

In the first step, the surface temperature E of the recording medium is preferably 30° C. to 60° C., and more preferably 40° C. to 60° C. When the surface temperature E of the recording medium is within the above range, the thickening of ink is suppressed, and thus ejection stability tends to be more excellent. The surface temperature E of the recording medium can be controlled using at least one of the IR heater 3 and the platen heater 4.

The surface temperature E of the recording medium is lower than the glass transition temperature B. The difference (B–E) between the glass transition temperature B and the surface temperature E of the recording medium is preferably 10° C. or higher, and more preferably 15° C. or higher. Meanwhile, B–E is preferably 50° C. or lower, and more preferably 40° C. or lower. That is, B–E is preferably 10° C. to 50° C., and more preferably 15° C. to 40° C. In this case, only the volatile components of the ink composition on the recording medium can be more selectively volatilized without softening the shell polymer of the polymer particle in the ink composition adhered to the recording medium.

Second Step

The second step is a step of drying the recording medium, on which the ink composition is adhered, at drying temperature D. The drying temperature D is higher than the glass transition temperature B. The difference (D–B) between the drying temperature D and the glass transition temperature B is preferably 5° C. or higher, and more preferably 10° C. or higher. Meanwhile, the difference (D–B) is preferably 50° C. or lower, and more preferably 40° C. or lower. That is, the difference (D–B) is preferably 5° C. to 50° C., and more preferably 10° C. to 40° C. When the drying temperature D is higher than the glass transition temperature B, with satisfying Formula (1) above, the shell polymer of the polymer particle in the ink composition adhered to the recording medium is softened, and simultaneously the core polymer is discharged, and thus these polymers are closely adhered to the recording medium.

After the second step, the ink composition on the recording medium is cooled by the cooling fan 6, and thus a film having high adhesiveness tends to be able to be formed on the recording medium.

In the second step, it is preferable that drying temperature D is used in a recording method at 45° C. to 130° C. the drying temperature D is preferably 55° C. to 120° C., and more preferably 70° C. to 110° C. When the drying temperature D is within the above range, the deformation of a substrate can be suppressed, and drying speed tends to be fast.

EXAMPLES

Hereinafter, the invention will be described in more detail using Examples and Comparative Examples. The invention is not limited to the following Examples.

Materials for Ink Composition

The main materials for the ink composition used in the following Examples and Comparative Examples are as follows.

Color Material
  C.I. Pigment Blue 15:3
Penetrant
  1,2-hexanediol
Moisturizing Agent
  1,2-propanediol
Cyclic Amid Compound
  2-pyrrolidone
Surfactant
  BYK348 (silicone-based surfactant, manufactured by BYK Japan KK)
Polymer Particles
  Polymer particle 1 (prepared by Preparation Example 1)
  Polymer particle 2 (prepared by Preparation Example 1)
  Polymer particle 3 (prepared by Preparation Example 1)
  Polymer particle 4 (prepared by Preparation Example 1)
  Polymer particle 5 (prepared by Preparation Example 2)
  Polymer particle 6 (prepared by Preparation Example 1)
  Polymer particle 7 (prepared by Preparation Example 1)

Preparation Example 1

Polymer Particles 1 to 4, 6, and 7

100 parts of ion exchange water was put into a reactor equipped with a dropping device, a thermometer, a water-cooling reflux condenser, and a stirrer, and 0.2 parts of ammonium persulfate as a polymerization initiator was added under a nitrogen atmosphere of 70° C. with stirring, and then a monomer solution containing 42.5 parts of methyl methacrylate, 22.5 parts of butyl methacrylate, 19.2 parts of lauryl methacrylate, and 7.7 parts of acrylic acid was dropped into the reactor to prepare a shell polymer by a polymerization reaction. Thereafter, a mixed solution of 0.2 parts of potassium persulfate, 9.2 parts of styrene, and 13.8 parts of n-butyl acrylate was dropped, and the resultant was polymerized with stirring at 70° C., and then the resultant product was neutralized with sodium hydroxide to adjust pH to 8 to 8.5, and filtered by a filter of 0.3 μm to obtain a core-shell polymer particle dispersion (polymer particle 1).

As shown in Tables 2 and 3, polymer particles 1 to 4, 6, and 7 were prepared in the same manner as polymer particle 1, except for changing the ratio of components constituting the shell and the core.

Preparation Example 2

Polymer Particle 5

100 parts of ion exchange water and 0.2 parts of potassium persulfate as a polymerization initiator were put into a reactor equipped with a dropping device, a thermometer, a water-cooling reflux condenser, and a stirrer, and a reaction liquid containing 40 parts of ion exchange water, 0.2 parts of potassium lauryl sulfate, 104 parts of methyl methacrylate, 13 parts of lauryl methacrylate, 13 parts of acrylic acid, and 0.5 parts of t-dodecyl mercaptan was added and polymerized under a nitrogen atmosphere of 70° C. with stirring, and then the resultant product was neutralized with sodium hydroxide to adjust pH to 8 to 8.5, and filtered by a filter of 0.3 μm to obtain a polymer particle aqueous dispersion.

Next, the glass transition temperature Tg (° C.) of each of the polymer constituting the core polymer and the polymer constituting the shell polymer was calculated using the above-described FOX Equation. In polymer particle 5, the glass transition temperature thereof was calculated in the same manner.

Preparation of Ink Composition

Raw materials were respectively mixed in the composition ratios (mass %) shown in Tables 3 and 4 below, and sufficiently stirred to obtain ink compositions. Here, pigment and polymer particle are represented by solid content. The results of the following evaluation tests are summarized in Tables 3 and 4.

Evaluation

Ejection Stability

A part of the printer Stylus Pro 9900 (manufactured by Seiko Epson Corporation) was modified to obtain a printer which can adjust the heating of a recording medium at the time of ink jet recording. Each of the ink compositions was ejected from nozzles of a recording head using this printer, and a solid pattern was formed on vinyl chloride coat paper JT5829R (manufactured by Mactac Co., Ltd.) as a recording medium. The ejected ink composition was dried by a curing unit, and was then cooled by a cooling fan. After continuous printing was performed for 10 hours, ejection stability was evaluated as follows. Here, maintenance was performed with respect to each recording for 2 hours. Recording conditions (mode) are shown in Table 2.

Here, the printer Stylus Pro 9900 (manufactured by Seiko Epson Corporation) has a platen heater and an IR heater as a recording medium heating unit, has a nozzle plate, an ink chamber, and a heater capable of controlling the warming of a path as a heat heating unit, has a platen heater and an IR heater as a curing unit, and has a platen heater as a preheater.

Evaluation Criteria

A: although non-ejection or ejection disturbance somewhat occurs during ejection, it returns to ejecting mode, and thus there is no problem.

B: although non-ejection or ejection disturbance somewhat occurs during ejection and does not return to ejection mode, a current state returns to a normal state by maintenance.

C: non-ejection or ejection disturbance somewhat occurs during ejection, and does not return to ejection mode, and a current state does not return to a normal state by maintenance.

TABLE 1

| | | Polymer particle 1 | | Polymer particle 2 | | Polymer particle 3 | | Polymer particle 4 | | Polymer particle 5 | | Polymer particle 6 | | Polymer particle 7 | |
|---|---|---|---|---|---|---|---|---|---|---|---|---|---|---|---|
| Core portion Tg | Tg: (A) ° C. | −10 | | −10 | | 38 | | 4 | | — | | 20 | | 38 | |
| Shell portion Tg | Tg: (B) ° C. | 24.7 | | 41 | | 76 | | 76 | | 76 | | 32 | | 32 | |
| Constitutional monomer | | Core-shell type | | Core-shell type | | Core-shell type | | Core-shell type | | Non-core-shell type | | Core-shell type | | Core-shell type | |
| Shell | MMA | 32.7 | 42.5 | 50.0 | 65 | 59.3 | 80 | 46.5 | 80 | 80 | 104 | 26.0 | 44.8 | 33.2 | 44.8 |
| component | BMA | 17.3 | 22.5 | 0.0 | 0 | 0.0 | 0 | 0.0 | 0 | 0 | 0 | 0.0 | 0 | 0.0 | 0 |
| | STA | 0.0 | 0 | 0.0 | 0 | 0.0 | 0 | 0.0 | 0 | 0 | 0 | 14.5 | 25 | 18.5 | 25 |
| | 2EHA | 0.0 | 0 | 0.0 | 0 | 0.0 | 0 | 0.0 | 0 | 0 | 0 | 13.1 | 22.5 | 16.7 | 22.5 |
| | LMA | 19.2 | 25 | 19.2 | 25 | 7.4 | 10 | 5.8 | 10 | 10 | 13 | 0.0 | 0 | 0.0 | 0 |
| | AA | 7.7 | 10 | 7.7 | 10 | 7.4 | 10 | 5.8 | 10 | 10 | 13 | 4.5 | 7.7 | 5.7 | 7.7 |
| Core | BA | 13.8 | 18 | 13.8 | 18 | 7.4 | 10 | 23.3 | 40 | 0 | 0 | 0.0 | 0 | 7.4 | 10 |
| component | St | 9.2 | 12 | 9.2 | 12 | 18.5 | 25 | 18.6 | 32 | 0 | 0 | 0.0 | 0 | 18.5 | 25 |
| | BMA | 0 | 0 | 0 | 0 | 0 | 0 | 0.0 | 0 | 0 | 0 | 41.9 | 72 | 0.0 | 0 |
| Total amount of monomer | | 100 | 130 | 100 | 130 | 100.0 | 135 | 100 | 172 | 100 | 130 | 100.0 | 172 | 100.0 | 135 |

MMA: methyl methacrylate
BMA: butyl methacrylate
LMA: lauryl methacrylate
AA: acrylic acid
BA: butyl acrylate
St: styrene Adhesiveness Each of the ink compositions was ejected from nozzles of a recording head using printer Stylus Pro 9900 (manufactured by Seiko Epson Corporation), and a solid pattern was formed on vinyl chloride coat paper JT5829R (manufactured by Mactac Co., Ltd.) as a recording medium. The ejected ink composition was dried by a curing heater, and was then cooled by a cooling fan. JIS standard cross-cut test on the obtained recorded matter was performed, and the adhesiveness of the ink composition was evaluated as follows.

Evaluation Criteria

A: peeling is not seen at all 25 grids.
B: peeling is seen at 3 grids or less among 25 grids.
C: peeling is seen at 3 grids or more among 25 grids.

High-Speed Printability

Each of the ink compositions was ejected from nozzles of a recording head using printer Stylus Pro 9900 (manufactured by Seiko Epson Corporation), and a solid pattern was formed on vinyl chloride coat paper JT5829R (manufactured by Mactac Co., Ltd.) as a recording medium. The ejected ink composition was dried by a curing heater, and was then cooled by a cooling fan. Recording resolution was set to 720×720 dpi, and mass (ink mass) per ink droplet was set to 21 ng. Application amount was changed by 7.5 mg to 11 mg per square inch, and solid pattern having 70% to 100% portion of Duty was formed. Aggregation unevenness on 70% to 100% portion of Duty of the obtained recorded matter was visually observed, and was evaluated as follows.

Evaluation Criteria

A: Aggregation unevenness cannot be visually observed.
B: Aggregation unevenness was visually observed in some ink mass
C: Aggregation unevenness was observed regardless of ink mass

TABLE 2

|  | Mode 1 | Mode 2 | Mode 3 | Mode 4 | Mode 5 | Mode 6 | Mode 7 | Mode 8 | Mode 9 | Mode 10 |
|---|---|---|---|---|---|---|---|---|---|---|
| Recording medium heating unit | Platen | Platen | Platen | Platen | IR | IR | IR | IR | — | IR |
| Preset temperature of recording medium heating unit *1 | 45 | 50 | 55 | 60 | 170 | 200 | 230 | 255 | — | 200 |
| Head temperature (C) ° C. | 35 | 40 | 45 | 50 | 50 | 55 | 60 | 65 | 20 | 55 |
| Drying temperature (D) ° C. | 100 | 100 | 100 | 100 | 100 | 100 | 100 | 100 | 100 | 60 |
| Surface temperature of recording medium (E) ° C. | 40 | 45 | 50 | 55 | 40 | 45 | 50 | 55 | 20 | 45 |

*1: temperature of heating unit after driving a drying heater for 1 hour

TABLE 3

| | | | Resin selection | | | | | | | | | Print mode, substrate selection | | | | | | | |
|---|---|---|---|---|---|---|---|---|---|---|---|---|---|---|---|---|---|---|
| | | Comp. Ex. 1 | Ex. 1 | Comp. Ex. 2 | Ex. 2 | Ex. 3 | Ex. 4 | Ex. 5 | Comp. Ex. 3 | Comp. Ex. 6 | Comp. Ex. 4 | Ex. 7 | Ex. 8 | Ex. 9 | Ex. 10 | Ex. 11 | Ex. 12 | Ex. 13 | Comp. Ex. 5 |
| Ink composition ratio | Pigment C.I. Pigment Blue 15:3 | 2 | 2 | 2 | 2 | 2 | 2 | 2 | 2 | 2 | 2 | 2 | 2 | 2 | 2 | 2 | 2 | 2 | 2 |
| | Penetrant 1,2-hexanediol | 6 | 6 | 6 | 6 | 6 | 6 | 6 | 6 | 6 | 6 | 6 | 6 | 6 | 6 | 6 | 6 | 6 | 6 |
| | 1,2-propanediol | 10 | 10 | 10 | 10 | 10 | 10 | 10 | 10 | 10 | 10 | 10 | 10 | 10 | 10 | 10 | 10 | 10 | 10 |
| | Cyclic amide compound 2-pyrrolidone | 10 | 10 | 10 | 10 | 10 | 10 | 10 | 10 | 10 | 10 | 10 | 10 | 10 | 10 | 10 | 10 | 10 | 10 |
| | Surfactant BYK348 | 1 | 1 | 1 | 1 | 1 | 1 | 1 | 1 | 1 | 1 | 1 | 1 | 1 | 1 | 1 | 1 | 1 | 1 |
| | Polymer particle Polymer particle 1 | 7 | 7 | — | — | — | — | — | — | — | — | — | — | — | — | — | — | — | — |
| | Polymer particle 2 | — | — | 7 | — | — | — | — | — | — | — | — | — | — | — | — | — | — | — |
| | Polymer particle 3 | — | — | — | 3 | 7 | 15 | — | 7 | — | — | 7 | 7 | 7 | 7 | 7 | 7 | 7 | — |
| | Polymer particle 4 | — | — | — | — | — | — | 7 | — | — | — | — | — | — | — | — | — | — | — |
| | Polymer particle 5 | — | — | — | — | — | — | — | — | — | — | — | — | — | — | — | — | — | — |
| | Polymer particle 6 | — | — | — | — | — | — | — | — | 7 | — | — | — | — | — | — | — | — | 7 |
| | Polymer particle 7 | — | — | — | — | — | — | — | — | — | 7 | — | — | — | — | — | — | — | — |
| | Pure water | 64 | 64 | 64 | 64 | 64 | 64 | 64 | 64 | 64 | 64 | 64 | 64 | 64 | 64 | 64 | 64 | 64 | 64 |
| | Total amount | 100 | 100 | 100 | 100 | 100 | 100 | 100 | 100 | 100 | 100 | 100 | 100 | 100 | 100 | 100 | 100 | 100 | 100 |
| | Print mode | Mode 6 | Mode 9 | Mode 6 | Mode 6 | Mode 6 | Mode 6 | Mode 6 | Mode 6 | Mode 6 | Mode 6 | Mode 1 | Mode 2 | Mode 3 | Mode 4 | Mode 5 | Mode 7 | Mode 8 | Mode 10 |
| Resin core portion Tg (A) ° C. | | −10 | −10 | −10 | 38 | 38 | 38 | 4 | 76 | 20 | 38 | 38 | 38 | 38 | 38 | 38 | 38 | 38 | 38 |
| Resin shell portion Tg (B) ° C. | | 24.7 | 24.7 | 41 | 76 | 76 | 76 | 76 | 76 | 32 | 32 | 76 | 76 | 76 | 76 | 76 | 76 | 76 | 76 |
| Print head temperature (C) ° C. | | 55 | 20 | 55 | 55 | 55 | 55 | 55 | 55 | 55 | 55 | 35 | 40 | 45 | 40 | 50 | 60 | 65 | 40 |
| Heating drying temperature (D) ° C. | | 100 | 100 | 100 | 100 | 100 | 100 | 100 | 100 | 100 | 100 | 100 | 100 | 100 | 100 | 100 | 100 | 100 | 60 |
| Recording medium surface (E) ° C. | | 45 | 20 | 45 | 45 | 45 | 45 | 45 | 45 | 45 | 55 | 40 | 45 | 50 | 55 | 40 | 50 | 55 | 45 |
| Evaluation items Ejection stability | | C | A | C | A | A | B | A | A | B | C | A | A | B | B | A | B | B | A |
| Adhesiveness | | A | B | A | A | A | A | A | C | B | C | A | A | A | A | A | A | A | C |
| High-speed printability (aggregation unevenness) | | A | B | A | A | A | A | A | A | B | B | B | A | A | A | B | A | A | C |

TABLE 4

| Ink composition ratio | | Ex. 7 | Ex. 8 | Ex. 9 | Ex. 10 | Ex. 11 | Ex. 12 | Ex. 13 | Comp. Ex. 5 |
|---|---|---|---|---|---|---|---|---|---|
| Pigment | C.I. Pigment Blue 15:3 | 2 | 2 | 2 | 2 | 2 | 2 | 2 | 2 |
| Penetrant | 1,2-hexanediol | 6 | 6 | 6 | 6 | 6 | 6 | 6 | 6 |
| | 1,2-propanediol | 10 | 10 | 10 | 10 | 10 | 10 | 10 | 10 |
| Cyclic amide compound | 2-pyrrolidone | 10 | 10 | 10 | 10 | 10 | 10 | 10 | 10 |
| Surfactant | BYK348 | 1 | 1 | 1 | 1 | 1 | 1 | 1 | 1 |
| Polymer particle | Polymer particle 1 | — | — | — | — | — | — | — | — |
| | Polymer particle 2 | — | — | — | — | — | — | — | — |
| | Polymer particle 3 | 7 | 7 | 7 | 7 | 7 | 7 | 7 | 7 |
| | Polymer particle 4 | — | — | — | — | — | — | — | — |
| | Polymer particle 5 | — | — | — | — | — | — | — | — |
| | Polymer particle 6 | — | — | — | — | — | — | — | — |
| | Polymer particle 7 | — | — | — | — | — | — | — | — |
| Pure water | | 64 | 64 | 64 | 64 | 64 | 64 | 64 | 64 |
| Total amount | | 100 | 100 | 100 | 100 | 100 | 100 | 100 | 100 |
| Print mode | | Mode 1 | Mode 2 | Mode 3 | Mode 4 | Mode 5 | Mode 7 | Mode 8 | Mode 10 |
| Resin core portion Tg | (A) °C. | 38 | 38 | 38 | 38 | 38 | 38 | 38 | 38 |
| Resin shell portion Tg | (B) °C. | 76 | 76 | 76 | 76 | 76 | 76 | 76 | 76 |
| Print head temperature | (C) °C. | 35 | 40 | 45 | 40 | 50 | 60 | 65 | 40 |
| Heating drying temperature | (D) °C. | 100 | 100 | 100 | 100 | 100 | 100 | 100 | 60 |
| Recording medium surface | (E) °C. | 40 | 45 | 50 | 55 | 40 | 50 | 55 | 45 |
| Evaluation items | Ejection stability | A | A | B | B | A | B | B | A |
| | Adhesiveness | A | A | A | A | A | A | A | C |
| | High-speed printability (aggregation unevenness) | B | A | A | A | B | A | A | C |

The entire disclosure of Japanese Patent Application No. 2014-071243, filed Mar. 31, 2014 is expressly incorporated by reference herein.

What is claimed is:

1. A recording method, comprising:
ejecting an ink jet ink composition from a recording head of head temperature C (unit: °C.) onto a recording medium to adhere the ink jet ink composition thereonto; and
drying the recording medium, on which the ink jet ink composition is adhered, at drying temperature D (unit: °C.),
wherein the ink jet ink composition contains water and a polymer particle,
wherein the polymer particle has a core polymer containing a polymer of glass transition temperature A (unit: °C.) in the range of 25 C to 60 C, and a shell polymer containing a polymer of glass transition temperature B (unit: °C.) and formed on the surface of the core polymer, and
wherein the glass transition temperature A, the glass transition temperature B, the head temperature C, and the drying temperature D satisfy the following Formulae (1) and (2):

$$10 < B - A \qquad (1)$$

$$C < B < D \qquad (2).$$

2. The recording method according to claim 1, wherein the glass transition temperature B and the surface temperature E satisfy Formula (3):

$$E < B \qquad (3).$$

3. The recording method according to claim 1, wherein the shell polymer contains a polymer having a (meth)acrylate unit and a carboxylic acid monomer unit.

4. The recording method according to claim 1, wherein, in the ejecting of the ink jet ink composition, the recording medium is heated from a side of the recording head.

5. The recording method according to claim 1, wherein the ink jet ink composition further comprises:
at least one of a fluorine-based surfactant and a silicone-based surfactant; and
at least one of a glycol ether and an alkyl diol of 3 to 8 carbon atoms.

6. The recording method according to claim 1, wherein the drying temperature D is 45° C. to 130° C.

7. The recording method according to claim 1, wherein, in the ejecting of the ink jet ink composition, the surface temperature E (unit: °C.) of the recording medium is 30° C. to 70° C.

8. The recording method according to claim 7, wherein the glass transition temperature B and the surface temperature E satisfy Formula (3) below:

$$E < B \qquad (3).$$

* * * * *